J. C. COULOMBE.
FUEL FEEDING SYSTEM FOR INTERNAL COMBUSTION MOTORS.
APPLICATION FILED SEPT. 30, 1918.
1,406,157.
Patented Feb. 7, 1922.
2 SHEETS—SHEET 2.
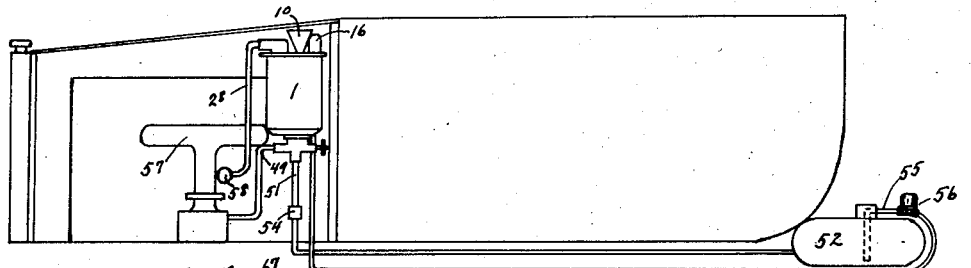
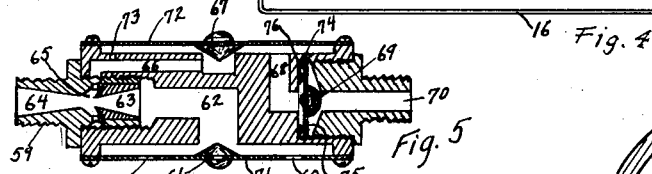
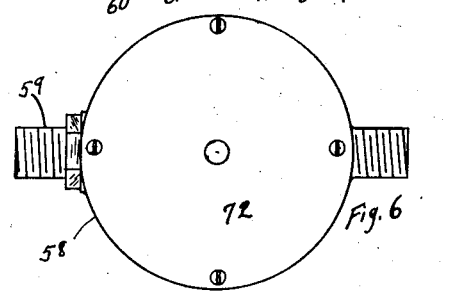
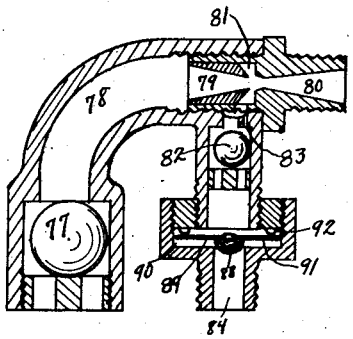
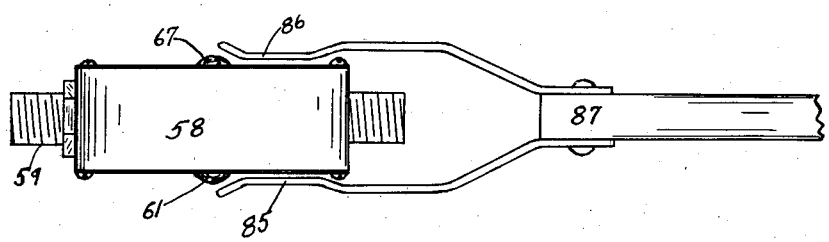

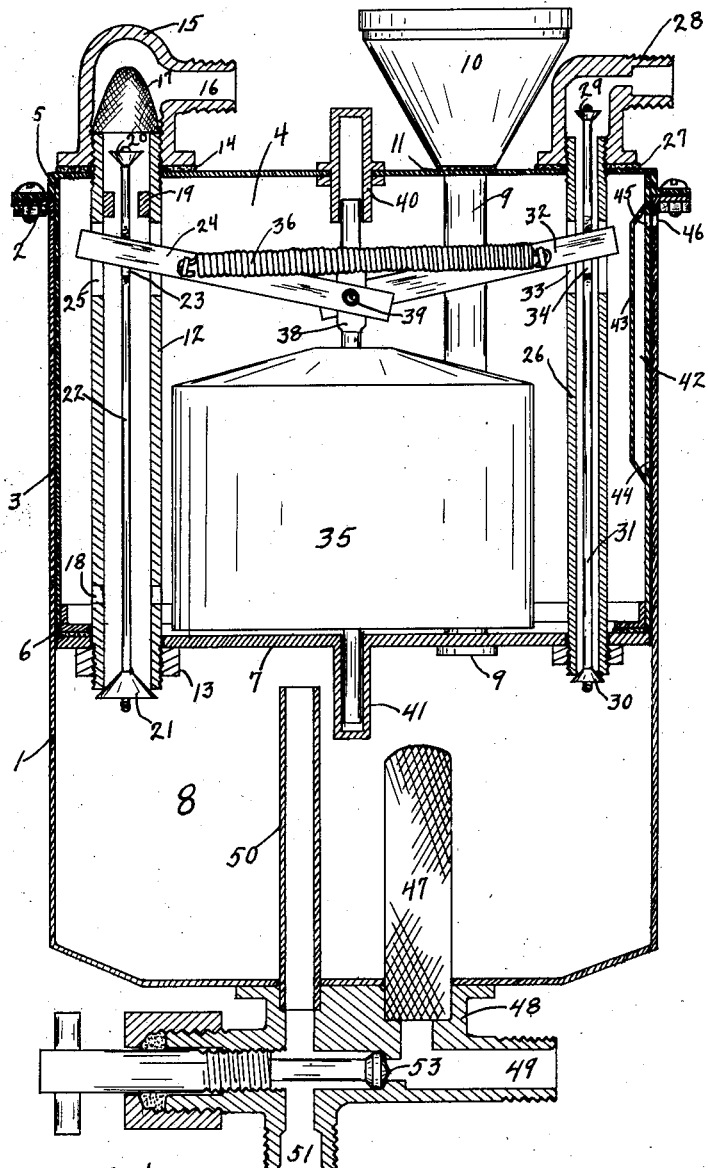
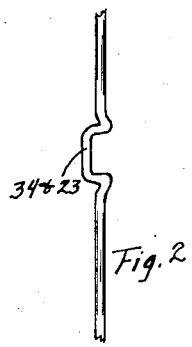
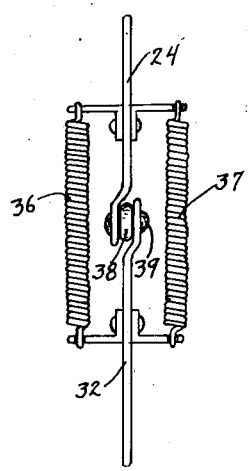

UNITED STATES PATENT OFFICE.

JOSEPH C. COULOMBE, OF DRACUT, MASSACHUSETTS.

FUEL-FEEDING SYSTEM FOR INTERNAL-COMBUSTION MOTORS.

1,406,157.  Specification of Letters Patent.  Patented Feb. 7, 1922.

Application filed September 30, 1918. Serial No. 256,246.

*To all whom it may concern:*

Be it known that I, JOSEPH C. COULOMBE, a citizen of the United States, residing at Dracut, in the county of Middlesex and State of Massachusetts, have invented certain new and useful Improvements in Fuel-Feeding Systems for Internal-Combustion Motors, of which the following is a specification.

My invention relates to improvements in fuel feeding systems in which suction is utilized to draw the fuel from a main tank to an auxiliary tank at a higher level and fed from there to a carburetter by gravity; and the objects of my improvements are first, to provide a simple and positive mechanism in the operating chamber; second, to provide a system that is accessible and easily taken apart; third, to provide means for starting the motor on a high grade fuel and to gradually change to a lower grade fuel; fourth, to provide an accessible strainer in the distributing chamber; fifth, to provide against the fuel flowing by gravity from the main tank; and sixth, to provide means to increase the operating suction on wide open throttle.

I attain these objects by the mechanism illustrated in the accompanying drawings in which—

Fig. 1 is a sectional elevation of the vacuum tank. Fig. 2 is a side view of valve stems 22 and 26, showing the off-set bends 23 and 34 co-operating with toggle levers 24 and 32. Fig. 3 shows a plan view of the spring toggle mechanism. Fig. 4 shows the complete installation as applied to a motor vehicle. Fig. 5 is a cross section of the suction increasing device 58. Fig. 6 is a plan view of the same device. Fig. 7 is a side view showing method of manual control. Fig. 8 is a sectional elevation of a modified form of device 58.

Fig. 1, 1 represents an outer shell having a flange 2 at its upper open end. 3, a shell forming body of chamber 4, soldered firmly to a flanged top 5 at its upper end. 6, a flange at the lower extremity of chamber 4 and having a removable plate 7 clamped thereto, forming a closed chamber. The shell 3 being of just enough smaller diameter than shell 1 to allow telescoping one within the other and forming a lower chamber 8. The flanged top 5, of upper chamber, resting on flange 2 of outer shell 1 and preferably fastened thereto by one or more screws. A vent tube 9 runs through chamber 4 and, with funnel 10, serves as a priming means. A resilient washer 11 serves to make an air tight joint for chamber 4.

A fuel tube 12 runs through chamber 4, nut 13 serves to form a shoulder and the whole firmly soldered to plate 7 and removable therewith, the upper portion projects through top 5 and an airtight joint made by means of resilient washer 14 and union nut 15. A series of holes 18 near the bottom of tube 12 allows free fuel flow to chamber 4. 19 is a valve seat near the upper portion of tube 12, while its lower extremity serves as a valve seat for valve 21. A valve stem 22 has securely fastened to each end valves 20 and 21. A U-shaped bend 23 in stem 22 furnishes shoulder stops engaged by end of toggle lever 24, through slot 25 in walls of tube 12.

Air tube 26 is fastened to plate 7 in same manner as tube 12, it protrudes through chamber 4 and an air tight joint is formed by means of resilient washer 27 and suction union piece 28. The extremities of tube 26 form valve seats for valves 29 and 30, said valves being connected by means of valve stem 31 and are operated by toggle lever 32, through slot 33 of tube 26, by means of shoulders formed by the U-shaped section 34 in stem 31. Float 35 operates toggle levers 24 and 32 against resistance of springs 36 and 37, by means of float stem 38 and pivot 39. 40 and 41 are guide bushings for upper and lower ends, respectively, of float stem 38.

An expansion pocket 42 is provided in the wall of chamber 4 by soldering a piece of metal 43 on the inside wall of chamber 4. Openings 44 and 45 allow the expanding liquid access to the pocket. A hole 46 insures atmospheric connection for the lower chamber 8, through the slight space between the shells 1 and 3.

A tubular strainer 47 is inserted in bottom casting 48, straining the fuel to carburetter. 49 is fuel line to carburetter. A stand-pipe 50 controls the overflow of fuel through line 51 to the main tank 52. A valve 53 controls the connecting passage between the carburetter fuel line 49 and the overflow line 51 to the main tank, enabling the draining of chamber 8 when desired. 54 is a check valve in the overflow line 51, preventing the flow of fuel returning from main tank. The fuel line 16 is inserted through the top of tank 52 and has a portion 55 extending towards the rear, instead of running immediately forward as customary, which prevents a gravity flow from tank 52 should it accidentally be in a higher plane than the auxiliary tank. 56 forms an air trap in the line to break the syphon action.

The source of suction here shown is the engine intake, through the manifold 57.

A device for enhancing the suction to operate the vacuum feed system is introduced somewhere in the suction line. The purpose of this device 58 is to change a large volume of comparatively low suction to a smaller volume of comparatively higher suction. This is accomplished by inducing atmospheric air into the suction line, operating in conjunction with the carburetter. On a closed throttle and high suction in the manifold, the device is inoperative, thereby not interfering with carburetion when it is most easily deranged. As the volume of flow of gaseous mixture increases with the opening of the throttle, a considerable amount of air may be induced without noticeably impairing the mixture, and as it is with the increased volume that the suction drops lower and lower, then it is that the device is put into operation.

The connection 59 is placed in the suction line in the direction of air flow—towards the manifold. Atmospheric air is admitted through holes 60, by valve 61, through port 62, through converging nozzle 63 and diverging nozzle 64, increasing the suction at point 65, leading to channel 66, valve 67, channel 68, valve 69 and out through connection 70 to operating chamber 4. The valve 61 is carried by a diaphragm 71 and is drawn to its seat when the suction is sufficient to overcome the spring resistance of the diaphragm.

When a vacuum fuel system is operated from the intake manifold of a motor, a restriction is generally placed in the suction line, in common practice it is a drill hole of .040 inches diameter. This is to prevent disturbing carburetion on closed throttle. On a comparatively wide open throttle a much larger hole could be used to very good advantage, as it is then that there is trouble in getting sufficient suction to properly operate the vacuum tank, and with the use of such a small hole the least small leak in the vacuum feed system makes matters a great deal worse. To overcome this difficulty, I provide the valve 67 which allows a large opening on low suction (wide open throttle), but is held to its seat against the spring resistance of diaphragm 72 on high suction (closed throttle), allowing only small hole 73 to be operative. Another form of this valve is shown in my co-pending application on a fuel feeding device, Serial No. 72,193, filed Jan. 15, 1916, in Fig. 1, parts designated as 37, 38, 39 and 40.

In Fig. 8 is shown another form of device 58. Instead of spring operated valves, ball valves 77 and 82 are used, their weights being such as to take the place of the spring resistance of the diaphragms 71 and 72 of Fig. 5. On high suctions the ball valve 77 is held to its seat and the device becomes inoperative, on low suctions the valve drops, allowing the induction of air through channel 78, nozzles 79 and 80, to the intake manifold, thereby enhancing the suction in annular space 81 leading to ball valve 82, valve 88 and port 84 to the vacuum feed mechanism. On high suctions the ball valve 82 is drawn to its seat, allowing only small opening 83 to be operative.

There are times when it may be desirable to positively place the device 58 out of operation, such as when starting in cold weather. I therefore provide a manually operated means for doing this. A spring fork having the ends 85 and 86 is pushed forward to engage the heads of valves 61 and 67, pressing said valves against their seats and thereby making the device inoperative. The spring fork ends 85 and 86 are attached to a handle 87 and carried back to a place accessible from the driver's seat, as on the dash or steering column (not shown).

In certain types of motors the suction pulsation requires the use of check valves between the source of suction and the operating mechanism of the vacuum tank. There are two forms of check valves used for this purpose. One is the common ball check, the other is a light disc valve, shown in a co-pending application, Serial No. 72,193, in Fig. 1, as parts 36 and 37. The ball check is the more dependable, having a smaller seating surface, it is less likely to stick. On the other hand, the disc valve is more efficient, as it has less weight for the same area of opening. In order to obtain a still more efficient valve than the disc type, and to have the non-sticking qualities of the ball type, I provide a ball-shaped valve portion attached to a thin disc of larger area, as shown in Figs. 5 and 8. Fig. 8, 88 is a ball-shaped valve part attached to disc 89, whose diameter is only slightly less than that of chamber 90. One or more holes 91, in disc 89, insure sufficient passage for the air when valve 88 is open. One or more projections 92 limit the movement of the disc and insure the free passage of air.

In Fig. 5, 69 is the valve part attached disc 74, having perforations 75 and stops 76.

The operation is as follows:

The vehicle having been stopped while running on a low grade fuel, the valve 53 is opened to drain contents of chamber 8, it is then closed and high grade fuel poured in through funnel 10. Push rod 87 is set to the inoperative position and the motor is started, after which the rod may be returned to its normal position. The motor, while running on almost closed throttle with no load, will produce a high suction in the intake manifold and the valves 61 and 67 will be drawn to their seats so that device 58 will be inoperative, until such a time as the motor is laboring under load with practically wide open throttle then, with the drop of suction in the manifold, the valves 61 and 67 will open and deliver more effective suction for operation.

The float being in the position shown, valves 21 and 30 will be closed and valves 20 and 29 open. The suction, entering by valve 29, will cause fuel to enter chamber 4, from tank 52, through fuel line 16 and valve 20. As the fuel level rises, the float will rise with it, forcing toggle lever pivot 39 beyond the neutral point, when the springs 36 and 37 will force lever 32 down, knocking open valve 30 and closing valve 29. This will allow air to enter chamber 4 through valve 30 and slot 33, reducing the high vacuum and releasing valve 21, which will be opened and valve 20 closed by the springs forcing down lever 24, stopping the flow of incoming fuel and allowing the fuel to drop to chamber 8. The float will gradually drop with the fuel level until pivot 39 is again below the neutral point, when the levers 24 and 32 will resume their upward position, closing valves 21 and 30 and opening valves 20 and 29, when the operation will be repeated until lower chamber 8 is filled to a level approximating the level of valve 30. This level will remain practically constant, regardless of the level of fuel in chamber 4, as the atmosphere is admitted to chamber 4 only through valve 30 as long as the motor is running, when the motor stops, however, air will gradually leak by valve 29 from the manifold, unless it is always absolutely air tight, allowing the liquid level in the two chambers to equalize. In order to avoid any danger of possible derangement of flow to carburetter, due to this change in level, an overflow tube 50 is provided which drains the excess level when the motor stops.

Having described my invention, what I claim as new and desire to secure by Letters Patent is:

1. In an apparatus of the character described, a receptacle having a suction connection, an atmospheric connection, a fuel outlet connection, a valve controlling one of said connections, a float in said receptacle operatively connected to two levers, said levers being fastened to a movable pivot and extending on opposite sides of said pivot, a spring connection between said levers extending on opposite sides of said pivot, and one of said levers arranged to operate said valve.

2. In a device of the character described, a receptacle comprising two chambers, an atmospheric connection for the lower chamber, a closed pocket attached to the inside wall of the upper chamber, the lower end of said pocket having communication to the lower chamber and the upper end of said pocket having communication to the atmosphere.

3. In a motor vehicle, an auxiliary fuel tank located above the fuel inlet of the motor, a main fuel tank located below the level of said auxiliary tank, a fuel line connecting said tanks and an air trap in said fuel line to break the syphon action to prevent gravity flow from said main tank to said auxiliary tank.

4. In combination with an internal combustion motor, an auxiliary fuel tank adapted to be operated by suction, a source of suction, a suction line connecting said tank with said source of suction, and an air inducing means between said tank and said source of suction adapted to increase the suction produced by said source of suction.

5. In combination with an internal combustion motor, an auxiliary fuel tank adapted to be operated by suction, a source of suction, a suction line connecting said tank with said source of suction, an air inducing means between said tank and said source of suction adapted to increase the suction produced by said source of suction and adapted to operate only when the suction in said suction line drops below a certain predetermined point.

6. In combination with an internal combustion motor, an auxiliary fuel tank adapted to be operated by suction, a source of suction, a suction line connecting said tank with said source of suction, an air inducing means between said tank and said source of suction adapted to increase the suction produced by said source of suction, and manually operated means for making said air inducing means inoperative.

7. In combination with an internal combustion motor, an auxiliary fuel tank adapted to be operated by suction, a source of suction, means of communication between said tank and said source of suction, and an automatic means of increasing the area of opening in said means of communication when the suction in said source of suction drops below a certain predetermined point.

8. In combination with an internal combustion motor, an auxiliary fuel tank adapted to be operated by suction, a source of suction, means of communication between said tank and said source of suction, said means of communication having two openings, and means for opening and closing one of said openings.

9. In combination with an internal combustion motor, an auxiliary fuel tank adapted to be operated by suction, a source of suction, a suction line connecting said tank with said source of suction, a check valve between said source of suction and said suction line, said valve having an enlarged rear portion of greater cross-sectional area than the forward portion engaging the valve seat.

10. In an apparatus of the class described, a receptacle comprising an operating chamber and a discharge chamber, said operating chamber having a suction connection and an atmospheric connection in its top and bottom respectively, said connections being in line with one another, a valve spindle carrying a valve at both ends and adapted to alternately close and open said suction and atmospheric connections, a float in said operating chamber operatively connected to said valve spindle, and a fuel inlet and fuel outlet for said operating chamber.

11. In an apparatus of the class described, a receptacle comprising an operating chamber and a discharge chamber, said operating chamber having a suction connection and an atmospheric connection in its top and bottom respectively, said connections being in line with one another, a valve spindle carrying a valve at both ends and adapted to alternately close and open said suction and atmospheric connections, a float in said operating chamber operatively connected to said valve spindle, a tube connected to said atmospheric connection and disposed so as to deliver atmospheric air to said operating chamber above the fuel level therein, a fuel inlet and a fuel outlet for said operating chamber.

12. In a device of the character described, a receptacle comprising two chambers, the lower chamber composed of an upwardly opening vessel having a rim flange extending away from its axis, the upper chamber telescoping into said lower chamber, said upper chamber having a non-removable top with a rim flange extending away from its axis, and a removable bottom for said upper chamber.

13. In a device of the character described, a receptacle comprising two chambers, the lower chamber composed of an upwardly opening vessel having a rim flange extending away from its axis, the upper chamber telescoping into said lower chamber and having a rim flange extending away from its axis and adapted to rest on the flange of the lower chamber, and a vent tube running through said upper chamber but not communicating with said upper chamber.

14. In a device of the character described, a receptacle comprising two chambers, the lower chamber composed of an upwardly opening vessel, the upper chamber telescoping into said lower chamber, an expansion pocket in the said upper chamber the upper part of said pocket connecting with the atmosphere and the lower part connecting with the said lower chamber.

JOSEPH C. COULOMBE.

Witnesses:
SAM POULIOT,
WILFRED M. HEBERT.